April 12, 1932. E. H. REMDE 1,853,780
INDUSTRIAL TRUCK
Original Filed Sept. 4, 1926 6 Sheets-Sheet 3
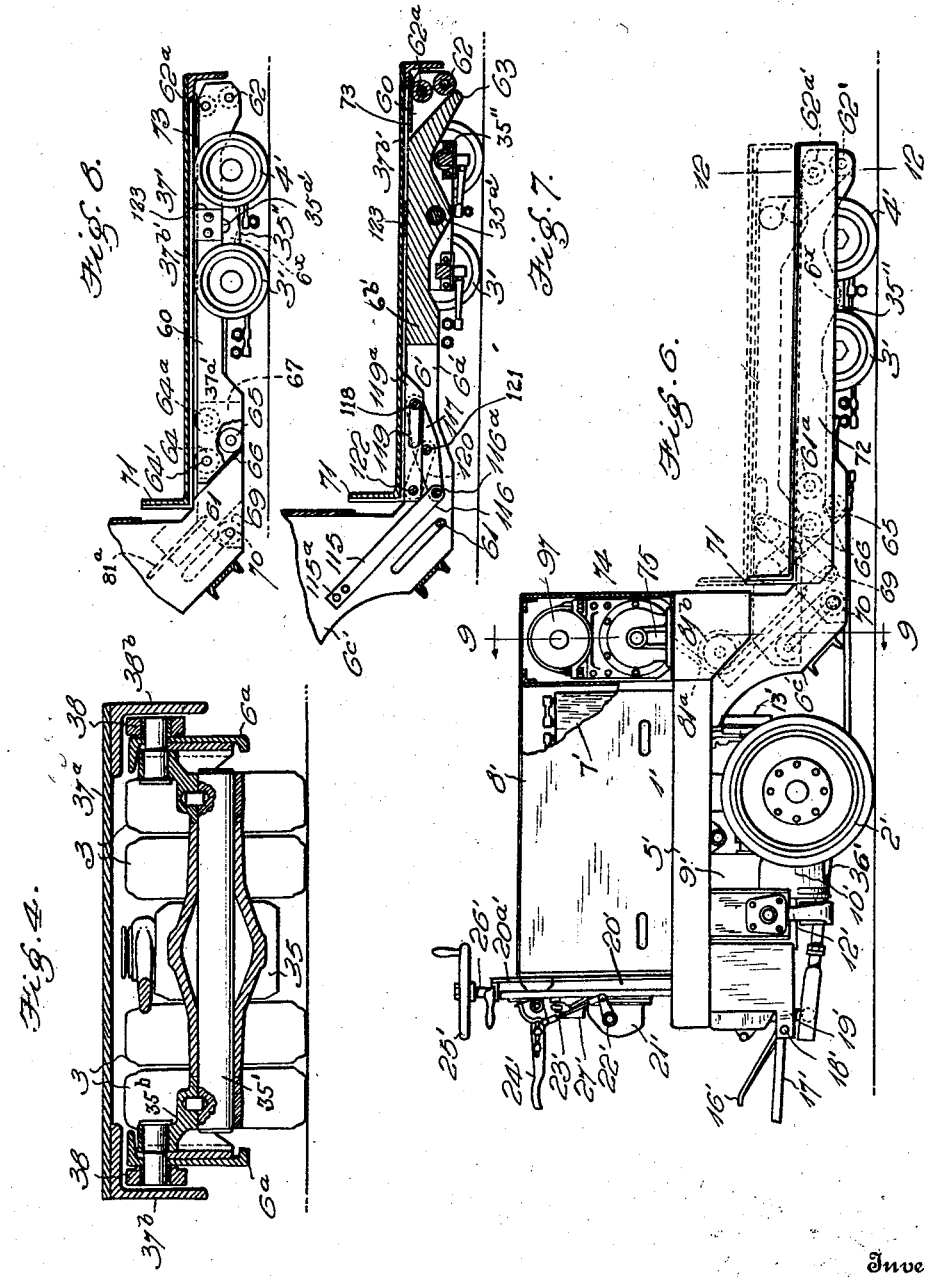
Inventor
Edward H. Remde
By Geo. R. Pitt
Attorney

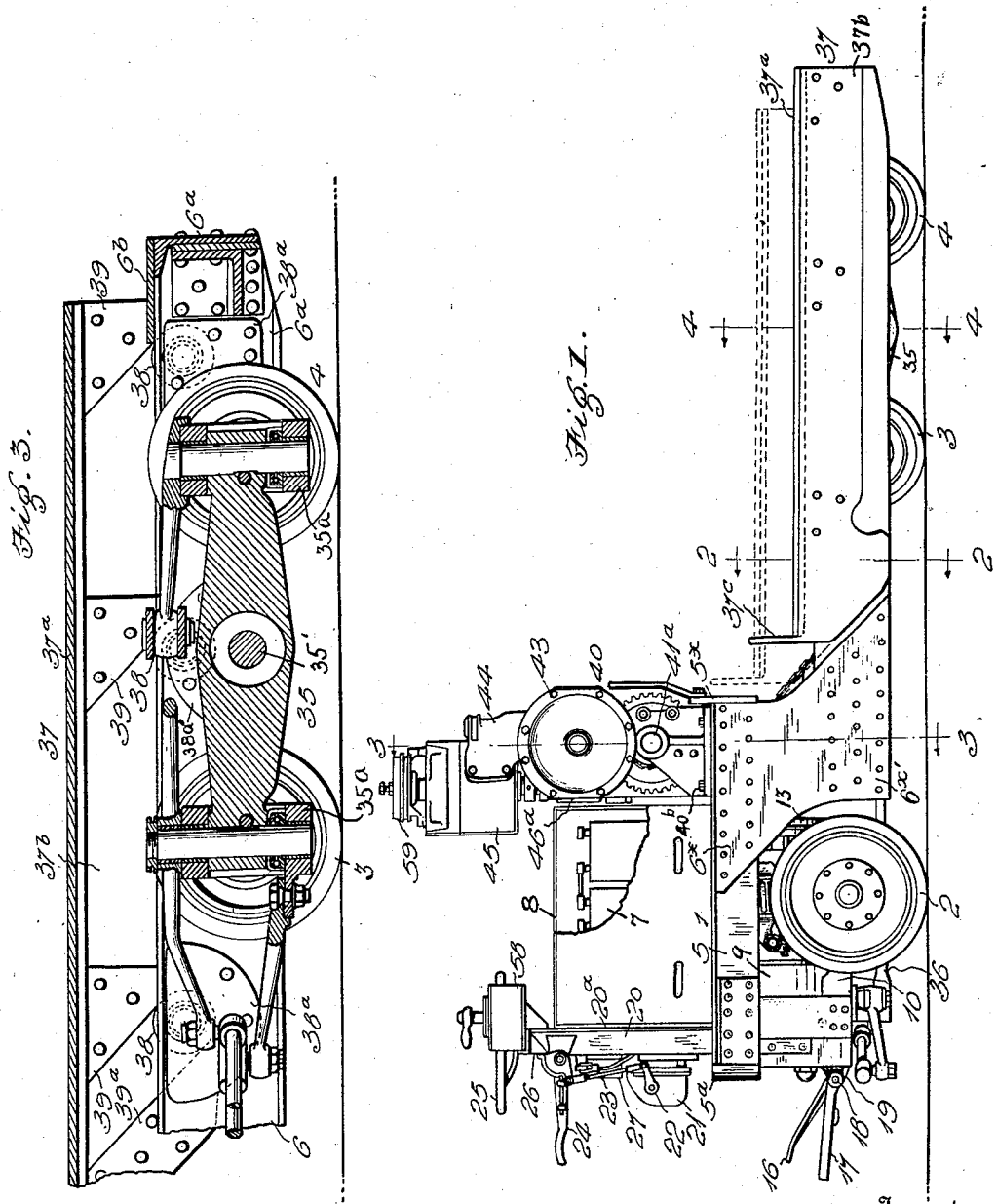

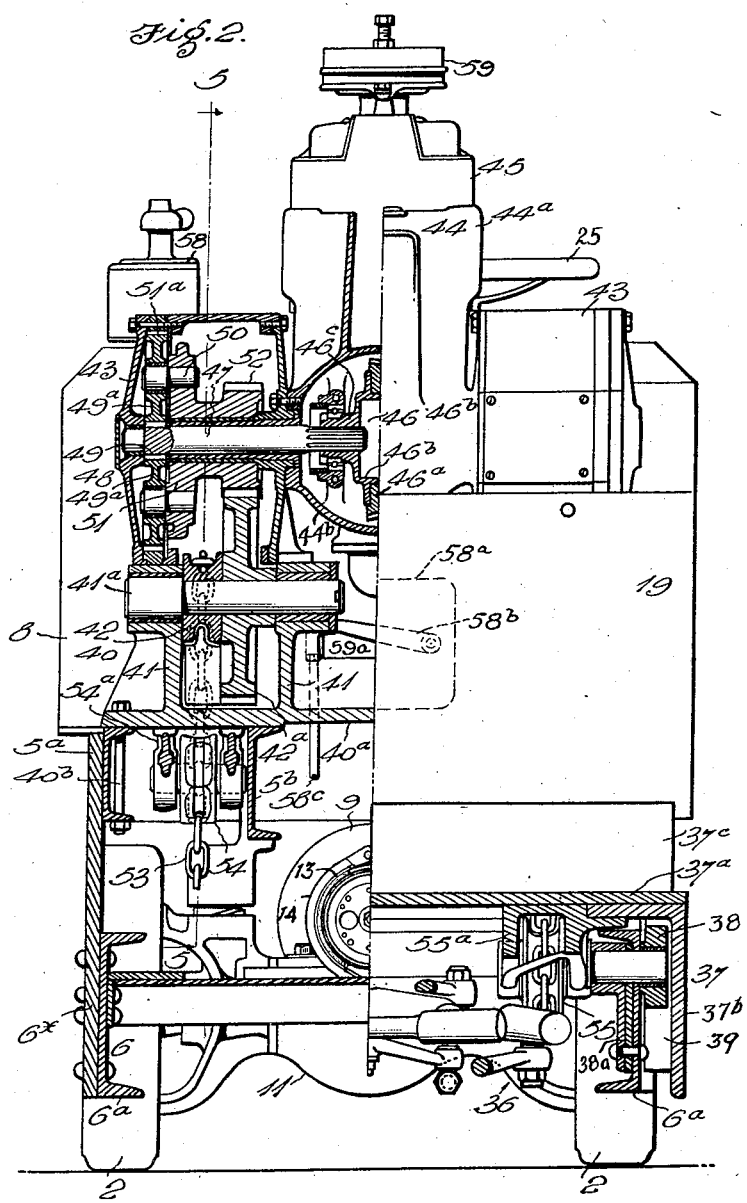

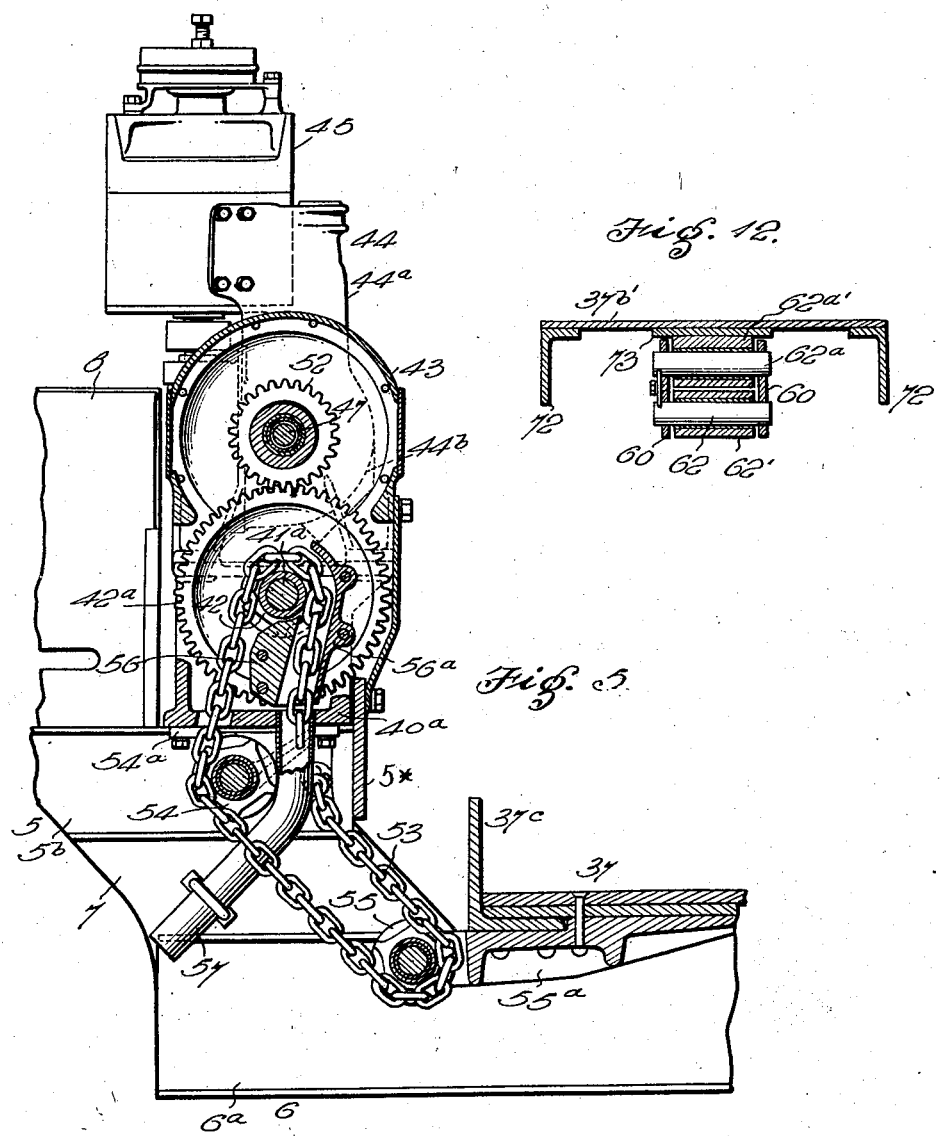

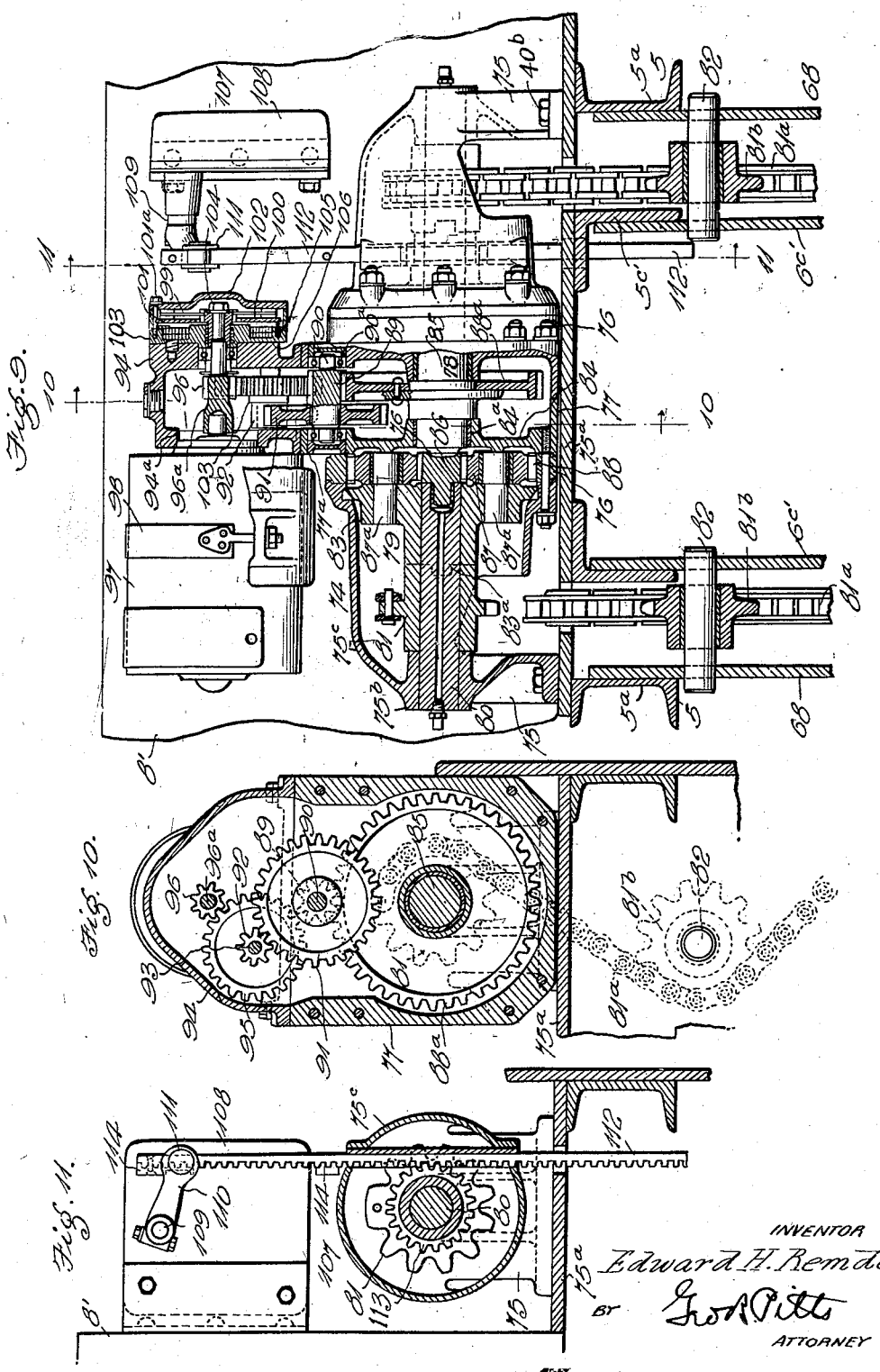

April 12, 1932.　　　　E. H. REMDE　　　　1,853,780
INDUSTRIAL TRUCK
Original Filed Sept. 4, 1926　　6 Sheets-Sheet 6
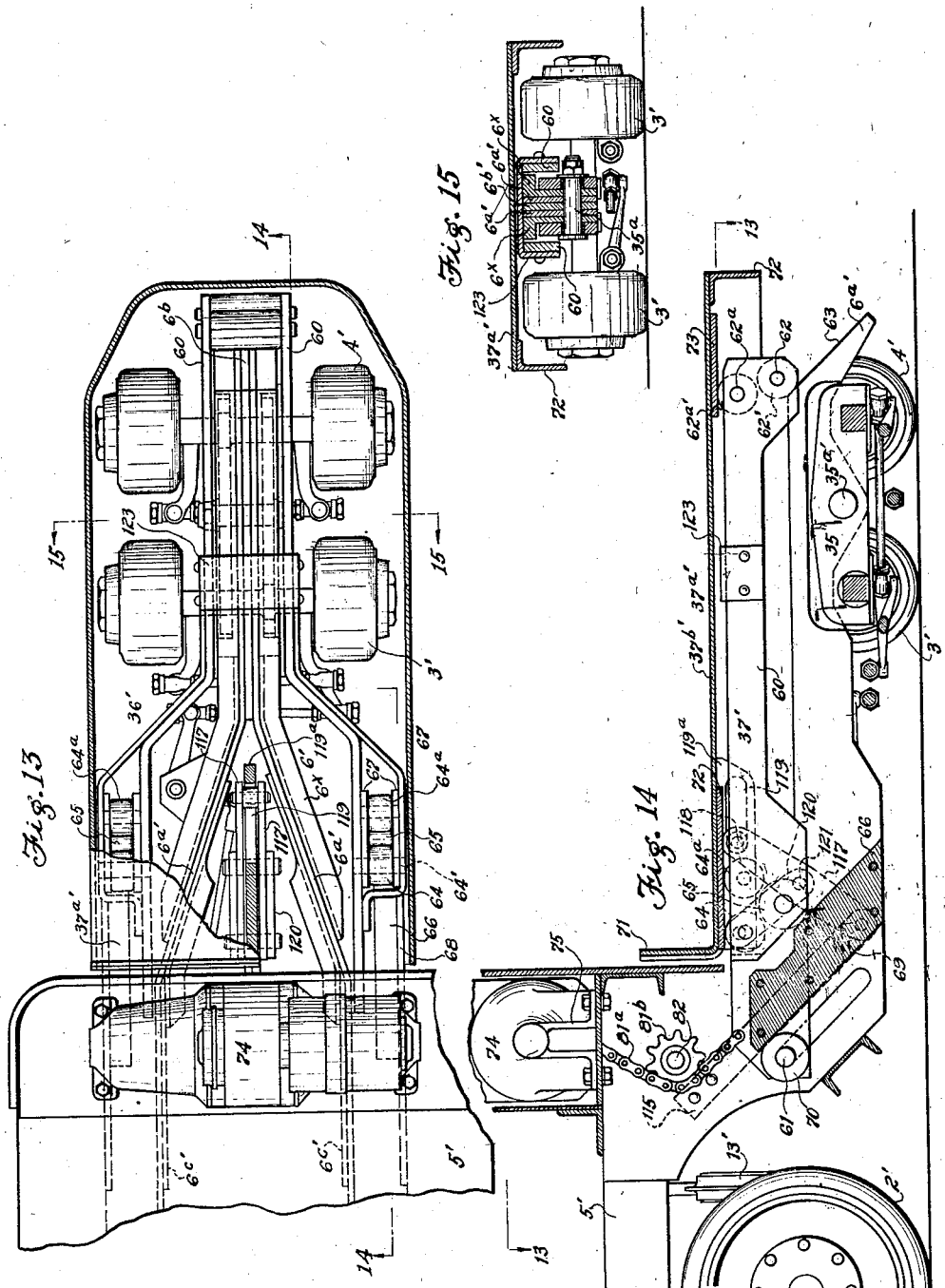

Patented Apr. 12, 1932

1,853,780

UNITED STATES PATENT OFFICE

EDWARD H. REMDE, OF CLEVELAND, OHIO, ASSIGNOR TO THE BAKER-RAULING COMPANY, OF CLEVELAND, OHIO, A CORPORATION OF OHIO

INDUSTRIAL TRUCK

Original application filed September 4, 1926, Serial No. 133,699. Divided and this application filed August 18, 1928. Serial No. 300,504.

This invention relates to an industrial truck having an elevating member. The invention is illustrated as applied to a truck having an elevating member capable of elevating and lowering and transporting relatively heavy loads.

One object of the invention is to provide a truck of this character having an improved elevating means, whereby the load may be elevated and lowered with minimum power.

Another object of the invention is to construct an improved truck of this character having a plurality of pairs of wheels below the load carrying and elevating member and to provide therefor means for simultaneously steering certain or all of the wheels in an easy and ready manner, whereby the truck may be turned within a relatively small area.

This application is a division of my application Ser. No. 133,699, filed September 4, 1926.

A further object of the invention is to provide a truck of this character having an improved raising and lowering mechanism.

Other objects of the invention will be apparent to those skilled in the art to which my invention relates from the following description taken in connection with the accompanying drawings wherein Fig. 1 is a side elevation of a truck embodying my invention.

Fig. 2 is a composite sectional view on lines 2—2 and 3—3 of Fig. 1.

Fig. 3 is a vertical section on the longitudinal axis of the elevating portion of the form of construction shown in Fig. 1.

Fig. 4 is a section on line 4—4 of Fig. 1.

Fig. 5 is a section on line 5—5 of Fig. 2.

Fig. 6 is a side elevation of a truck embodying my invention wherein certain features of the construction are slightly modified.

Fig. 7 is a fragmentary vertical section on the longitudinal axis of the elevating portion of the form of construction shown in Fig. 6.

Fig. 8 is a side elevation of the elevating portion with the elevating member shown in section.

Fig. 9 is an elevation of the hoisting means partly in section on the line 9—9 of Fig. 6.

Fig. 10 is a section on the line 10—10 of Fig. 9.

Fig. 11 is a section on the line 11—11 of Fig. 9.

Fig. 12 is a section on the line 12—12 of Fig. 6.

Fig. 13 is a plan view of the parts shown in Figs. 6, 7 and 8, the platform being broken away.

Fig. 14 is a section on the line 14—14 of Fig. 13, the elevating member being shown in elevated position.

Fig. 15 is a section on the line 15—15 of Fig. 13.

In the drawings, 1 indicates as an entirety a frame supported at one end by a pair of traction wheels 2 and at its opposite or load supporting end by sets of trailing wheels 3, 4, to which reference will later be made. The wheels 3, 4, may be mounted on knuckles for steering purposes or on axles which are pivoted to effect steering.

The frame 1 preferably comprises a main horizontal section 5 and a load carrying section 6 which is preferably relatively low or disposed in a plane below the main section 5, as shown. Where the frame 1 is of this construction, the wheels 3, 4, are preferably smaller than the traction wheels 2. The sections 5, 6, are rigidly connected by drop plates 6x, preferably riveted to the sections in a well known manner. The main section 5 of the frame may be formed from channel bar stock 5a bent into substantially U-shape, their free ends being connected by a tie bar 5x. The tie bar and front transverse portion of the channel bar 5a are connected by a pair of parallel bars 5b.

The frame section 6 may be formed from channel bars 6a, forming the sides and outer end thereof and connected in a well known manner. Adjacent its outer end the frame section supports a transverse plate 6b, the purpose of which will later appear.

7 indicates a power supply, such as a series of storage batteries. The batteries are supported on the horizontal frame section 5 and are preferably enclosed in a sheet metal casing 8.

9 indicates an electric motor operatively connected through a suitable power transmitting mechanism and axle having driving axle sections to the wheels 2 to drive them in a well known manner. The motor 9 is connected to and carried by a cradle 10, which in turn is connected to the housing 11 for the power transmitting mechanism and driving axle sections. Suitable connections are provided between the motor and housing 11 and the main section 5, these connections preferably being of the suspension type such as described and claimed in application Serial No. 420,630, filed by John H. Hertner and myself, jointly (see Letters Patent No. 1,628,-145). The axle for the wheels 2 is provided with suitable knuckles (see Fig. 2) by means of which the wheels 2 are mounted to swing, whereby they may be steered as will later be set forth.

13 indicates as an entirety a brake mechanism, which includes a brake wheel fixed to an extended end of the propeller shaft driven by the motor 9 and brake shoes 14 arranged to engage therewith and operated by a suitable linkage connected to a pedal 16; a spring being connected to the linkage and normally operating to apply the brake shoes and raise the pedal 16, so that operation of the pedal downwardly will release the brake and put the spring under tension. The brake mechanism may be similar in construction to that shown in Letters Patent No. 1,710,071.

17 indicates a platform on which the operative stands. The platform may be pivoted on a cross shaft 18 mounted in a pair of brackets 19; the brackets in turn are carried by a pair of depending plates secured to a pair of uprights 20. The uprights 20 are secured to the side bars 5b of the frame 5. The upper portions of the uprights carry a dash 20a.

21 indicates a controller of suitable construction, the shaft of the controller being connected to a countershaft 22, which in turn is connected by an arm and link 23 with a lever 24 pivoted on the adjacent upright 20 and swingable upwardly and downwardly.

25 indicates a steering wheel connected to a column or shaft 26. The shaft 26 is mounted in suitable bearings, preferably comprising one or more collars secured to the adjacent upright 20. The steering connections between the shaft 26 and the wheels 2, 3 and 4 serve to steer the wheels about a common center. As the truck having wheels and steering connections therefor forms the subject-matter of my co-pending application Ser. No. 42,559, filed July 9, 1925, no claim thereto is made herein and for the same reason it is thought unnecessary to further describe the steering connections.

A switch mechanism, indicated as an entirety at 27, is operatively connected with the brake mechanism 13 so that the circuit from the batteries 7 to the motor 9 is broken when the brake is applied, and closed when the pedal 16 is pushed downwardly and the brake released. As this switch mechanism is not claimed herein but forms the subject matter of application Serial No. 32,736, (see Letters Patent No. 1,620,167), further description herein will not be necessary.

An axle frame is indicated as an entirety by 35. This frame is mounted to rock on a transverse shaft 35' and carries at its front and rear ends axles 35a, 35a, for the wheels 3 and 4. The shaft 35' is mounted in brackets 35b supported on the frame 6, as shown in Fig. 4.

Suitable steering connections 36 are provided for the joint cooperation of the wheels 2, 3 and 4 so that the same may be operated simultaneously about a common center preferably from a single lever mounted between the traction wheels 2 and sets of trailing wheels 3, 4.

37 indicates as an entirety the elevating member movably mounted on the frame section 6 whereby the latter and said member may be projected below a load and the elevating member then operated to lift the load or free it from its support and the load transported and then lowered to discharge it. The elevating member 37 comprises a platform 37a having skirts 37b along its longitudinal sides, and an angle 37c along its inner end. When in lowered position the outer end of the platform 37a rests on the plate 6b and its opposite end rests on the bars 6a (see Fig. 2). In the form of construction shown in Figs. 1 and 5, inclusive, pairs of rollers and inclines, each in opposed relation, are mounted between the frame section 6 and the elevating member 37, so that upon the application of power substantially endwise of the frame section or, as shown in the drawings, in a plane parallel to the inclines, the elevating member 37 will move upwardly and thus lift or elevate any load that may be on or above it. By preference, the rollers, indicated at 38, are loosely mounted on the outer sides of the frame section 6 (see Figs. 2 and 3) and the inclines, indicated at 39, are mounted on the inner sides of the skirts 37b. I preferably provide 3 pairs of rollers and inclines, the rollers 38 for the end pairs being mounted on backets 38a secured to the channel bars 6a and the rollers for the remaining pair being mounted on shafts supported in flanges 38a'. 39a indicates members or guides carried by the skirts and disposed parallel to two aligned inclines 39, preferably the inclines adjacent the inner end of the platform and spaced therefrom a distance substantially equal to the diameter of the adjacent rollers 38, whereby the guides 39a engaging with the latter serve to maintain the inclines in engagement with their respective rollers and to prevent outward movement of the platform horizontally, at the end of its movement downwardly.

40 indicates as an entirety the hoisting mechanism for raising and lowering the elevating member 37. Of this mechanism, 40a indicates a base secured, as by bolts 40b, to the flanges of the channel bars 5a and having pairs of upstanding hangers 41 provided with suitable bearings to support the opposite ends of the shafts 41a to each of which a sprocket 42 and a gear 42a are keyed. As only the left hand portion of Fig. 2 is shown in section, but one pair of hangers 41, the shaft 41a mounted thereon and one sprocket 42 and one gear 42a are shown. The purpose of the sprocket and gear will appear later. The hangers 41 form supports for casings 43, and the latter in turn support a casting 44, the upper portion of which serves as a cradle 44a for an electric motor 45 and the lower portion of which is shaped to form a housing 44b for the power transmitting mechanism 46. The power transmitting mechanism 46 preferably consists of a worm gear 46a fixed to an annular member 46b having laterally projecting hubs 46c, which rotate in bearings mounted within the housing 44b. The worm gear 46a is driven by a suitable worm, fixed to a propeller shaft which is driven by the motor 45. In the following description of the driving means between the annular member 46b and the gears 42a, it will be understood that the parts between one hub 46c of the annular member and the adjacent gear are similar in construction and arrangement to those between the other hub and the adjacent gear, for which reason the parts at one (the left hand) side of the truck are shown. Within the hubs 46c are splined the inner ends of shafts 47, which are driven together, in one direction or the other by the power transmitting mechanism 46, and which transmits its power through a suitable gear reduction 48 to the gear 42a to rotate the adjacent sprocket 42. Each shaft 47 extends through the adjacent end wall of the housing 44b, the inner end wall of the adjacent casing 43 and through the latter and has bearing in the outer end wall thereof. Of the gear reduction for each shaft 47, 49 indicates a pinion carried by the shaft 47, the teeth constituting the pinion being preferably formed integrally therewith. The pinion 49 meshes with a pair of gears 49a loosely mounted on stub shafts 50 carried by a disk or plate 51 rotatably supported on the shaft 47 by a bushing thereon. The gears 49a also mesh with a stationary ring gear 51a mounted within the casing 43 whereby the disk or plate 51 is rotated, but at a slower rate of speed than the shaft 47. 52 indicates a pinion, preferably formed integrally with the hub of the disk 51 and meshing with the gear 42a to drive it, the gear 42a preferably being somewhat larger than the driving pinion 52 to effect a further reduction of the power. 53 indicates chains (preferably of the link type) operatively connected with the elevating member 37 and running over the sprockets 42, whereby the rotation of the gears 42a will pull on or pay out the chains 53. The chains 53 are preferably formed from a single section so that the pull thereon or paying out thereof will be equalized to effect rectilinear movement of the elevating member 37. Furthermore, the chains are so supported and guided that their pull and paying out is in a plane substantially parallel to the plane of the inclines 39. From one sprocket 42, the adjacent chain leads downwardly around a guide sprocket 54, and then to and around a sprocket 55 loosely mounted on a shaft supported in the flanges of a casting 55a on the inner end of the elevating member 37, and then upwardly to one of the frame bars 5b. The chain leads through openings in the bars 5b (see Figs. 2 and 5), its other end being carried around the sprockets at the other side of the elevating member and then around the other driven or rotated sprocket 42. Each sprocket 54 is mounted in a bracket 54a preferably bolted to the lower side of the base 40a. Each free end of the chain is guided between guides 56, 56a, fixed to the standards 41 and a laterally bent pipe 57, so that it will not get tangled in the sprockets 54, 55.

58 indicates a controller for the motor 45. The upper end of the motor shaft is provided with a braking means 59 having a brake member, normally operated into braking relation with a stationary member and released by a suitable solenoid, the winding of which is connected in series with the motor 45. The brake member, the operating means therefor and solenoid are not shown, but one example thereof is shown and described in my copending application Serial No. 400,239, filed October 17, 1929.

59a indicates a switch mechanism for opening the motor circuit through one of the switches whenever the elevating member reaches a predetermined position. The switch mechanism is enclosed in a casing 58a and operated by a lever 58b connected by a link 58c to the platform 37 in a suitable manner. This switch mechanism forms the subject matter of my co-pending application Serial No. 523,286 (see Letters Patent No. 1,726,-717), and therefore no claim is made thereto.

In Figs. 6 to 15, inclusive, I have shown another form of construction in which the trailing wheels are mounted on knuckles for steering purposes, the power mechanism is somewhat simplified and the connections between the lifting chains and the elevating member are of a form to control the platform so that in raising or lowering the lifting member the platform moves substantially vertically instead of in a direction parallel to the inclines.

Referring to these views, 1' indicates the frame supported at one end by traction wheels 2' and at its load supporting end by sets of trailing wheels 3', 4'. The frame 1' preferably comprises a main horizontal section 5' and a relatively low or sub-section 6'. In this form of construction, the frame section 6' consists of a pair of bars 6a' (reinforced by channels—not shown) having converging sections and parallel sections secured to an intermediate plate or bar 6b'. As shown in Fig. 7, these bars are cut away on their lower portions, to clear the axles for the wheels 3', 4'. At their inner ends the bars 6a' are connected to plates 6c', depending from longitudinal sills 5c' whereby the sections 5', 6', are rigidly connected.

7' indicates a power supply such as a series of storage batteries supported on the section 5' and preferably enclosed in a sheet metal casing 8'.

9' indicates an electric motor operatively connected through a suitable power transmitting mechanism and axle having driving axle sections to the wheels 2' to drive them in the well known manner. The motor 9' is connected to and carried by a cradle 10', which in turn is connected to the housing for the power transmitting mechanism and driving axle sections. 12' indicates as an entirety connections between the motor and housing and the main section 5', these sections preferably being of the suspension type such as described and claimed in Letters Patent No. 1,628,145, already referred to. The axle for the wheels 2' is provided with suitable knuckles (as already described herein) by means of which the wheels 2' are mounted to swing, whereby they and the wheels 3', 4', may be steered about a common center.

13' indicates as an entirety a brake mechanism, which includes a brake wheel fixed to an extended end of the propeller shaft driven by the motor 9' and brake shoes arranged to engage therewith and operated by a linkage (not shown) connected to a pedal 16'; a spring being connected to the linkage and normally operating to apply the brake shoes and raise the pedal 16', so that the operation of the pedal downwardly will release the brake and put the spring under tension.

17' indicates a platform on which the operative stands. The platform may be pivoted on a cross shaft 18' mounted in a pair of brackets 19'; the brackets in turn being supported in any well known manner. The uprights 20' are secured to certain of the bars of the frame 5' and support a dash 20a'.

21' indicates a controller of suitable construction, the shaft of the controller being connected to a shaft 22', which in turn is connected by an arm and link 23' with a lever 24' pivoted on the adjacent upright and swingable upwardly and downwardly.

25' indicates a steering wheel connected to a column or shaft 26' suitably mounted in bearings secured to the adjacent upright 20'. The steering connections, indicated at 36', between the wheels 2', 3', and 4' and the shaft 26' serve to steer all of the wheels simultaneously about a common center.

27' indicates as an entirety a switch mechanism operatively connected with the brake mechanism 13' so that the circuit from the batteries 7' to motor 9' is broken when the brake is applied and closed when the pedal 16' is pushed downwardly and the brake released. As the switch mechanism is not claimed herein but forms the subject matter of the Letters Patent No. 1,620,167 already referred to, further description herein will not be necessary.

35'' indicates as an entirety an axle frame mounted to rock about a transverse axis 35a' and carrying at their opposite ends spaced axles for the wheels 3' and 4', these wheels being mounted on suitable knuckles, whereby they may be steered.

37' indicates as an entirety the elevating member supported in the manner to be later set forth on the frame section 6' and movable relative thereto so that it may be moved into position below a load to be lifted and transported and then elevated to lift the load or clear it from its supporting surface, or lowered to permit the load to engage a supporting surface and then removed from below it. In this form of construction the elevating member is raised and lowered by the coaction of inclines and rollers between it and the frame section 6', and such member consists of an operating section and a load engaging and carrying section, with compensating devices between the latter and the frame 1', whereby the load carrying section moves substantially vertically during movement of the operating section. Of the elevating member 37', 37a' indicates the operating section comprising pairs of bars 60 connected at their front ends by a rod 61 and also by a plurality of tie plates (not shown). The outer portions of the bars 60 are inset (see Fig. 12) so as to be disposed between the sets of wheels 3', 4', and one bar of each pair is extended outwardly beyond the wheels 4' and supports a pair of shafts 62, 62a, for rollers 62', 62a', respectively, the former roller being arranged to engage an incline 63 provided on the outer or free ends of the bars 6a', 6a', 6b', (see Fig. 7), and the latter roller serving as a support for the outer end of the load carrying section 37b'. Near their front ends, one bar 60 of each pair is offset relative to the other bar to accommodate a set of rollers 64, 64a, 65, the latter of which engages an incline 66. The rollers 64, 64a, 65 are loosely mounted on shafts supported at their ends in plates 67, disposed parallel to the offset portions of the bars 60, the shaft 64' for the roller 64 extending through the bars 60 to connect the plates 67 thereto. The inclines 66 are supported on the inner sides of plates 68 depending from the frame bars 5b'. The opposite side edges of the inclines 66 extend parallel thereto to form guides 69 with which engage rollers 70 loosely mounted on the opposite ends of the rod 61 to maintain the rollers 62' and 65 in operative engagement with the inclines 63, 66, respectively, during the raising and lowering of the operating section 37a'. The rollers 64, 64a support the inner end of the load carrying section 37b'. The load carrying section 37b' comprises a plate having an upstanding member 71 at its inner end to prevent the load from engaging the relatively stationary portions of the frame 5' and a skirt 72 formed from a section of angle bar extending around the sides and outer end of the plate. The inwardly extending flange of the bar 72 is arranged to engage the rollers 64, 64a, and a plate 73 on the inner portion of the platform or load carrying section 37b' engages the roller 62a', so that the section 37b' can freely move relative to the section 37a' as the latter is raised and lowered.

74 indicates as an entirety a power mechanism for raising and lowering the elevating member 37'. Of this mechanism, 75 indicates standards mounted on a base 75a and provided with hollow bosses 75b and inwardly extending casing sections 75c which cooperate with annular members 76, 77 to form a housing for a part of a power transmitting mechanism 78 and gear reduction 79 to be later referred to. The hollow bosses 75b support the outer ends of shafts 80 which shafts are preferably pressed therein in a well known manner. 81 indicates sprockets rotatably mounted on the shafts 80 for chains 81a which are guided around sprockets 81b loosely mounted on shafts 82, each supported by the adjacent plate 68 and the depending plate 6c' spaced therefrom. The lower or free ends of the chains 81a are connected to the inner ends of the bars 60 (see Fig. 8), so as to raise the latter when the sprockets are rotated in one direction and to lower them when the sprockets are rotated in the opposite direction. 83 indicates disks also rotatably mounted on the shafts 80, the hub of each disk and the hub of the adjacent sprocket 81 being connected, preferably by clutch elements 83a, whereby the disks, when rotated, will drive the sprockets. 84 indicates webs or walls on the outer ends of the casing sections 77 and having axial openings 84a forming bearings for a driven shaft 85 which projects at its ends through the bearings and carries outwardly thereof pinions 86 and reduced ends rotatably fitting openings formed in the inner ends of the shafts 80, the pinions 86 being preferably formed integrally with the shaft and the center portion of the latter being enlarged to form shoulders that engage the bearing walls to prevent endwise movement of the shaft. The pinions 86 mesh with gears 87 rotatably mounted on stub shafts 87a carried by the disks and the gears 87 in turn mesh with internal ring gears 88 provided on the inner walls of the sections 76, whereby a planetary gear reduction is provided between the shaft 85 and each disk 83. 88a indicates a gear fixed to the shaft 85 substantially centrally thereof and in mesh with a pinion 89 fixed to a shaft 90 which is mounted at its ends in suitable bearings 90a. The bearings 90a are mounted in a well known manner in hollow bosses 77a provided on the upper portions of the casing members 77. 91 indicates a gear fixed to the shaft 90 and meshing with a pinion 92 fixed to a shaft 93 mounted in a supplemental cover section 94. 95 indicates a gear fixed to the shaft 93 and meshing with the pinion 96 fixed to a shaft 96a, which is connected (preferably detachably) at one end to the shaft of a motor 97. The adjacent end of the motor casing removably fits the walls of an opening 94a formed in the side walls of the cover section 94, being held rigidly in such position by a bracket or cradle extending laterally from the cover section 94 and a strap or other damping device 98 engaging the motor casing and bracket. The other end of the shaft 96a is mounted in suitable bearings in the opening in the adjacent side wall of the cover section and extends therethrough and carries on its outer or free end a disk 99, which constitutes one element of a brake 100. The other element of the brake consists of a disk 101 held against rotation by a series of bolts 101a which secure the cover 102 to a plate 103 having a boss fitting the bearing opening and secured therein by the shoulder of a sleeve secured on the outer end of the shaft 96a by a nut 104, the latter also securing the brake element 99 to the shaft. The non-rotatable disk 101 is normally pressed outwardly by a plurality of springs, one being shown at 105 in Fig. 9, into engagement with the disk 99 to brake it or hold it against rotation. The disk 101 is formed of soft iron and is operated inwardly, against the tension of the springs 105, by a winding 106, when the latter is energized. The winding 106 is connected in series with the motor 97 so that when the latter is started the coil is energized and the brake released.

The limit switch mechanism 107 comprises a casing 108 secured to the rear wall of the battery casing 8' and enclosing a pair of switches either of which is opened to break the motor circuit by a device operated by the rock shaft 109. The switches are shown and disclosed in my aforesaid Letters Patent No. 1,726,717. 110 indicates an arm fixed to the rock shaft 109. The outer end of the arm is bifurcated and formed with aligned openings to receive a rotatable plug 111 which is slotted to slidably receive a bar 112. The bar 112 extends downwardly through and slidably fits aligned openings formed in the adjacent casing section 75c. The inner edge or face of the bar 112 is provided with a rack which meshes with a pinion 113 fixed to the hub of the adjacent disk 83, whereby the pinion 113 is rotated and the bar moved endwise upwardly or downwardly when the power transmitting mechanism is operated. The upper portion of the bar 112 is provided with tappets 114 disposed on the opposite sides of the arm 110 and arranged to engage therewith and swing it to rock the shaft 109 and then break the motor circuit following the rotation of the sprockets 81 in pulling on or paying out the chains 81a to move the operating section in either direction or beyond a predetermined position.

The compensating devices between the operating section 37a' and load carrying section 37b' herein illustrated comprise the following: 115 indicates a pair of bars connected by rivets 115a to the depending plates 6c' and extending downwardly and outwardly, their outer portions being bent inwardly to form a single connecting element 116, carrying a pivot pin 116a. 117 indicates a link pivotally connected at one end to the pin 116a and at its other end pivotally connected to a shaft or pin 118. The link 117 preferably comprises a pair of elements disposed upon opposite sides of the element 116. The shaft or pin 118 has sliding and pivotal bearing in elongated aligned slots 119 formed in the related flanges of a pair of angles 119a secured to the lower surface of the load carrying section 37b'. 120 indicates a link preferably consisting of two elements disposed on the outer sides of the elements 117 and pivotally connected at one end to the latter intermediate its ends by a pin 121. The opposite ends of the link 120 is pivotally connected to a pin 122 supported by the flanges of the angles 119a.

The compensating devices operate as follows: When the operating section 37a' is elevated along the inclines 63, 66, which is the resultant of a horizontal component and a vertical component, it will carry with it the load carrying section 37b', but due to the connection of the latter through the link 120 with the link 117, which is stationarily connected at one end to the frame 1' through the bars 115 and slidably and pivotally connected to the section 37b' at its other end, the load carrying section 37b' will traverse the vertical component of the resultant without moving along the horizontal component thereof, as shown in dotted lines in Fig. 6. During this movement the load carrying section 37b' in effect slides on the operating section longitudinally thereof outwardly, for which reason the rollers 64, 64a', 62a', are provided to reduce the friction between them. In lowering the operating section 37a', the load carrying section 37b' traverses the vertical component downwardly and slides relative to the operating section in an inward direction. Accordingly in raising or lowering the load, the latter is operated substantially vertically in either direction. As a result the total length of the truck can be made shorter and danger of the load engaging the main frame section or mechanisms thereon is avoided.

123 indicates a yoke for connecting the bars 60, 60, together.

To those skilled in the art to which my invention relates many changes in construction and widely differing embodiments and applications of my invention will suggest themselves without departing from the spirit and scope thereof. The description and disclosures herein are purely illustrative and are not intended to be in any sense limiting.

What I claim is:

1. In a power driven, industrial truck construction, the combination of a frame having an elevated portion and a relatively low portion disposed adjacent the floor, wheels for supporting said frame, an elevating platform movably mounted at its opposite ends on said relatively low portion to move upwardly and downwardly relative thereto, and a mechanism on said elevated portion for raising and lowering said platform, said mechanism comprising a motor, a shaft, a power transmitting means between said motor and said shaft arranged to drive the latter, a sprocket on said shaft and a chain engaging said sprocket and connected to said elevating platform.

2. In a power driven, industrial truck construction, the combination of a frame comprising an elevated portion and a relatively low portion disposed adjacent the floor, wheels for supporting said frame, an elevating member, co-acting inclines and rollers interposed between said frame and member adjacent the ends of the latter, serving to guide the latter upwardly and downwardly, and a raising and lowering mechanism comprising a motor, a shaft, power transmitting means between said motor and said shaft arranged to drive the latter, a sprocket on said shaft and a chain engaging said sprocket and connected to said member.

3. A truck construction as claimed in claim 2 in which the chain is arranged to pull or relieve said member in a direction parallel to the inclines and means are provided for at all times maintaining the inclines and rollers in active engagement.

4. In a power driven, industrial truck construction, the combination of a frame comprising an elevated portion and a relatively low portion disposed adjacent the floor, wheels for supporting said frame, an elevating member movably mounted on said relatively low portion for movement upwardly and downwardly, said member comprising an operating section and a load carrying section, a mechanism for raising and lowering said operating section, and means for causing relative movement between said sections as the operating section moves in either direction.

5. A truck construction as claimed in claim 4 in which the moving means comprises operating connections between said load carrying section and said frame.

6. In a power driven, industrial truck construction, the combination of a frame comprising an elevated portion and a relatively low portion disposed adjacent the floor, wheels for said frame, an elevating member movable upwardly and downwardly relative to said low portion, said member comprising an operating section and a load carrying section movably mounted thereon, supporting and guiding devices between said relatively low portion and said operating section, whereby the latter moves along an inclined plane, a mechanism for raising and lowering said operating section, and means for effecting relative movement between the sections of said elevating member, whereby the load carrying section moves substantially vertically during movement of the other section in either direction.

7. In a power driven, industrial truck construction, the combination of a frame comprising an elevated portion and a relatively low portion disposed adjacent the floor, wheels for said frame, an elevating member surmounting and movably mounted at its opposite ends on said relatively low portion for movement upwardly and downwardly, and mechanism on said elevated portion for raising and lowering said member, said mechanism comprising a pair of shafts, sprockets on said shafts, chains engaging said sprockets and connected to said elevating member, a power element secured to each of said shafts for rotating it, a driven member, a gear reduction between said driven member and each power element for transmitting power thereto to drive the adjacent shaft and means operatively connected with said driven member for driving it.

8. In a power driven, industrial truck construction, the combination of a frame comprising an elevated portion and a relatively low portion disposed adjacent the floor, wheels for said frame, an elevating member surmounting and movably mounted at its opposite ends on said relatively low portion for movement upwardly and downwardly, a mechanism mounted on said elevated portion for raising and lowering said member, said mechanism comprising a pair of shafts, sprockets on said shafts, chains engaging said sprockets and connected to said elevating member, a power element secured to each of said shafts for rotating it, operatively connected with the adjacent sprocket, a driven member in axial alignment with said shaft, a gear reduction between said driven member and each said power element for transmitting power to the latter to rotate the adjacent shaft, and means operatively connected with said driven member for driving it.

9. A truck construction as claimed in claim 4 in which the moving means includes a link between said load carrying section and said frame and a separate link between said operating section and said first mentioned link.

In witness whereof I have hereunto signed my name.

EDWARD H. REMDE.

CERTIFICATE OF CORRECTION.

Patent No. 1,853,780. Granted April 12, 1932, to

EDWARD H. REMDE.

It is hereby certified that the name of the assignee in the above numbered patent was erroneously described and specified as "The Baker-Rauling Company", whereas said name should have been described and specified as The Baker-Raulang Company, as shown by the records of assignments in this office; and that the said Letters Patent should be read with this correction therein that the same may conform to the record of the case in the Patent Office.

Signed and sealed this 17th day of May, A. D. 1932.

(Seal)

M. J. Moore,
Acting Commissioner of Patents.